Feb. 3, 1970

C. H. RUSSELL 3,493,787

BRIDGE CONTROLLED FLIP FLOP

Filed Feb. 11, 1965

INVENTOR.
CHARLES H. RUSSELL
BY
*Richard J. Kenk*
ATTORNEY

United States Patent Office 3,493,787
Patented Feb. 3, 1970

3,493,787
BRIDGE CONTROLLED FLIP FLOP
Charles H. Russell, New Brighton, Minn., assignor to Waynco, Inc., Winona, Minn., a corporation of Minnesota
Filed Feb. 11, 1965, Ser. No. 431,913
Int. Cl. H01g 9/00
U.S. Cl. 307—291        8 Claims

ABSTRACT OF THE DISCLOSURE

A time sampling circuit characterized by periodically pulsing a circuit capable of producing an unbalanced voltage condition, the latter circuit when unbalanced then triggering a flip flop circuit to actuate an energy sensitive device such as a switching or indicating circuit.

---

This invention relates to time sampling control and/or indication circuits. More particularly it relates to control circuits which sample the controlled environment at a constant frequency rate.

Basically, the present invention utilizes an unbalanced voltage condition to trigger a flip-flop circuit which in turn actuates a switching and/or indication circuit, power being supplied to the trigger at pulsed sampling intervals.

This concept, as a primary object, provides extremely high sensitivity because very small deviations from the control point will cause the flip-flop circuit to actuate.

A further object of the invention is to provide a control and/or indicating circuit which has very little hyseresis loss and thus will actuate on very low signal energy.

A still further object of the invention resides in a sensitive control circuit which does not rely on a regulated D.C. supply and retains its sensitivity despite large variations in line voltage.

Other objects and advantages of the invention will become apparent upon consideration of the accompanying specification, claims and drawings.

Figure 1:
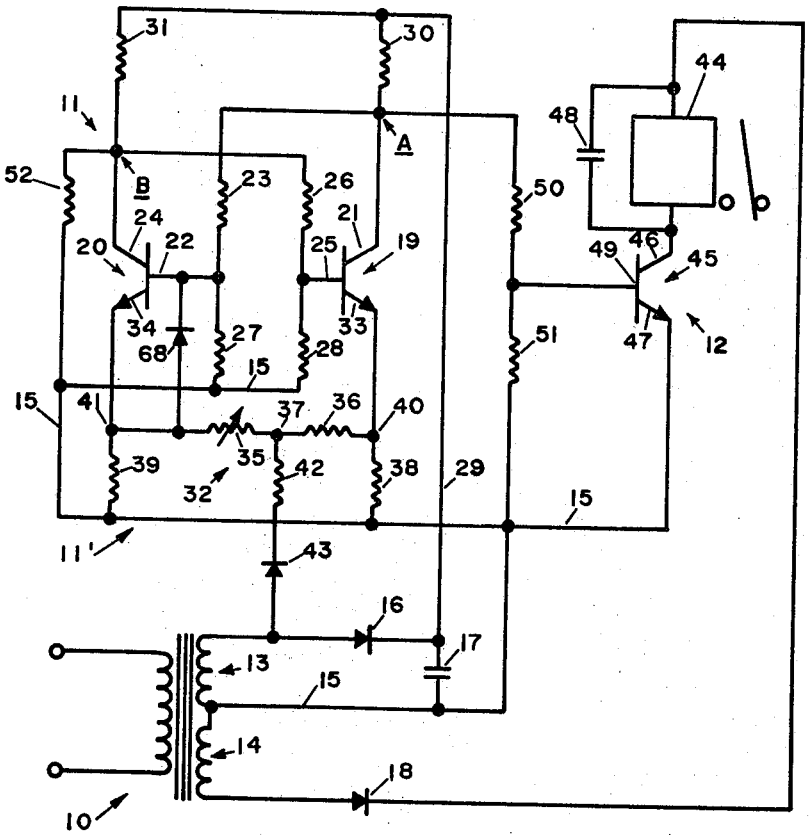
FIG. 1 is a schematic diagram of a circuit incorporating the concept of the invention.

Referring to FIG. 1, the circuit shown includes an A.C. power source in the form of a transformer 10, a flip-flop network 11, a triggering network 11' and a switching and/or indicating network 12.

The transformer 10 has two secondary windings 13 and 14 provided with a common center conductor 15. These windings are connected such that their outputs are out of phase with respect to one another, and in this example, 180° out of phase. Winding 13 provides a D.C. supply voltage for the flip-flop circuit 11 through a rectifier 16 and shunt filter capacitor 17, while winding 14 supplies half-wave A.C. power through a rectifier 18 to switching circuit 12.

With reference to the flip-flop circuit 11, it generally includes two transistors 19 and 20. Each of the transistors employs direct coupling between its base and the collector of the other. For example, transistor 19 has its collector 21 connected to the base 22 of transistor 20 through coupling resistor 23. In similar manner, transistor 20 has its collector 24 connected to the base 25 of transistor 19 through a coupling resistor 26.

Equalizing resistors 27 and 28 are connected between the respective transistor bases 22 and 25 and the common return conductor 15 to provide better transistor temperature stability.

Supply voltage (D.C.) to the transistors 19 and 20 is furnished by the transformer winding 13 via rectifier 16, conductor 29, collector resistors 30 and 31 and thence to collectors 21 and 24 respectively.

The flip-flop circuit 11 thus operates much in the manner of a conventional Eccles-Jordan circuit. When one transistor is conducting the other is cut off. In other words, when transistor 18 is conducting, transistor 20 is cut off, and conversely when transistor 20 is conducting transistor 19 is cut off. The circuit remains in one or the other of these two states of equilibrium with no change until some action occurs to cause the non-conducting transistor to conduct and vice versa.

Now according to the invention a voltage difference applied between the transistors of the flip-flop circuit is used to cut off one or the other of the transistors and start conduction of the other. In the present example, a bridge network 32 is used to trigger the flip-flop circuit, the bridge output being connected to emitters 33 and 34 of transistors 19 and 20 respectively. In the bridge, a variable resistor 35 (such as a temperature sensing transducer) and fixed resistor 36 in adjoining legs have a common junction 37, and in the other two legs adjoining equivalent resistors 38 and 39 connect to a common junction formed by conductor 15.

The output terminals of the bridge, namely junctions 40 and 41 are connected to emitters 33 and 34 respectively. Power to the bridge in the form of rectified half wave A.C. pulses is supplied at junction 37 through a current limiting resistor 42 via rectifier 43 connected to transformer winding 13, the circuit being completed via common conductor 15.

For purposes of controlling an energy source, or indicating the status of an environment being controlled, the flip-flop circuit 11 is coupled to the switching network indicated at 12. This network receives half-wave A.C. power pulses from transformer winding 14, through rectifier 18, to an energy sensitive element in the form of relay coil 44, through the power circuit of a control device such as transistor 45 having a collector 46 and an emitter 37, and thence to the common conductor 15. A capacitor 48 is shunted across relay coil 44 to prevent buzzing effects when it is actuated.

Transistor 45 has its base 49 coupled to a voltage divider formed by resistors 50 and 51. Resistor 50 is in turn coupled to collector 21 at junction A, which junction also connects to coupling resistor 23 for the base of transistor 20. To balance the loading on transistor 20 with that of 19, a resistor 52 is coupled at B to collector 24 of transistor 20. However this balancing load could also include a switching network similar to the network 12.

In operation, when variable bridge resistor 35 has a lower resistance than that of resistor 36, the voltage drop across 35 will be lower than that across 36 and the bridge junction 41 connecting to the output of transistor 20 will be more positive than the junction 40 connecting to the output of transistor 19. Therefore, transistor 20 will be cut off and transistor 19 will conduct. On the other hand, when the variable resistance 35 is greater than that of fixed resistor 36, the voltage drop across 35 will be greater and junction 41 will be less positive than junction 40 thereby causing transistor 19 to cut-off and start transistor 20 conducting.

Now, when transistor 19 is cut-off, the voltage thereacross from point A to common conductor 15 will rise to substantially the D.C. supply voltage from winding 13. This voltage is then reflected across the voltage divider 50 and 51 and across the base 49 of transistor 45 thereby causing it to conduct. Thus, current flows through the power circuit 46–47 of the transistor resulting in the relay coil 44 being energized.

On the other hand, when transistor 19 is conducting the voltage drop thereacross between point A and the common conductor 15 is relatively low, and therefore the voltage drop across the voltage divider 50–51 is low causing transistor 45 to assume a non-conducting state thereby de-energizing relay coil 44.

Figure 2:
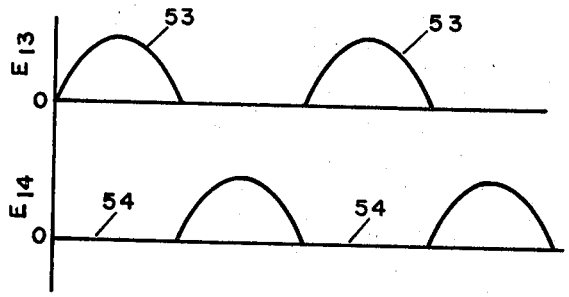
FIG. 2 is a curve showing the relationship between the sampling pulse of the circuit of FIG. 1 vs. the power actuating pulse for the switching and/or indication circuit.

Since the sampling pulse to the bridge circuit 32 through rectifier 43 is out of phase with respect to the power pulse to the switching network 12 through rectifier 18 as shown in FIG. 2, the circuit of this embodiment of the invention achieves a very unique feature in providing a scanning or sampling pulse of the environment being controlled before the relay coil 44 can pull in or drop out. That is, the relay coil 44 cannot be energized when the sampling pulse 53 (FIG. 2) is positive since the power pulse 54 at this point will be zero and the coil will retain its status quo position until it is activated by a change in the flip-flop circuit. Should the relay coil 44 be energized, the capacitor 48 will smooth-out pulsations and keep it energized during the negative or zero portion 54 of the power cycle.

Figure 3:
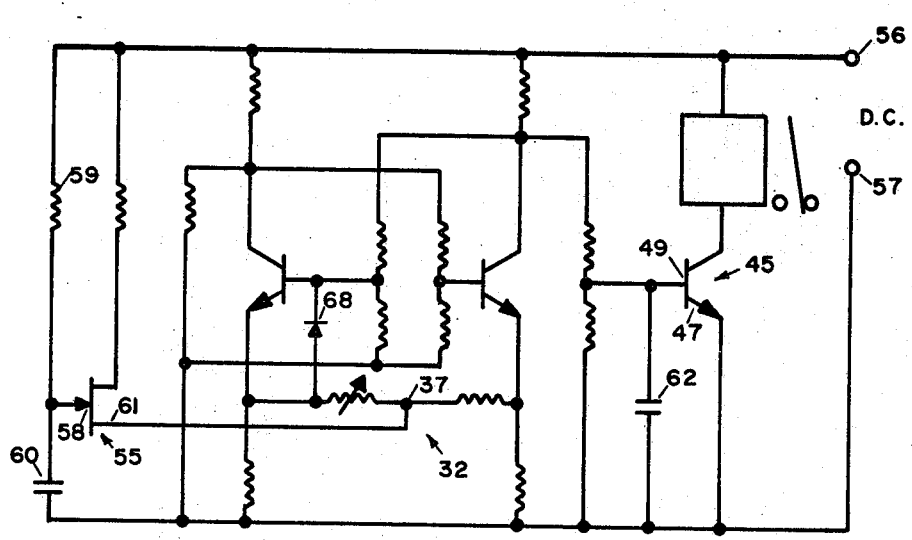
FIGS. 3 and 4 are schematic diagrams of modifications of the invention.

Another embodiment of the invention shown in FIG. 3 which differs from the embodiment shown in FIG. 1 by providing a unijunction transistor 55 as a source of the triggering pulse rather than the rectifier and transformer combination as discussed hereinbefore. In particular, the embodiment of FIG. 3 utilizes a D.C. supply across terminals 56 and 57. The emitter 58 of the uni-junction 55 is connected between a resistor 59 and a capacitor 60 forming an R-C circuit. Output electrode 61 of the uni-junction 55 is coupled to the input junction 37 of bridge 32. The sampling rate is determined by the time constant of this R-C circuit and the sampling pulse is a very narrow sharp spike.

After sufficient voltage is built up across the R-C network, the uni-junction conducts thereby sending a pulse to the bridge 32 cutting off either of the transistors 19 or 20. A capacitor 62 is shunted across the base 49 to the emitter 47 of the switching transistor 45 to filter out the amplified trigger pulse and prevent relay chatter.

Figure 4:
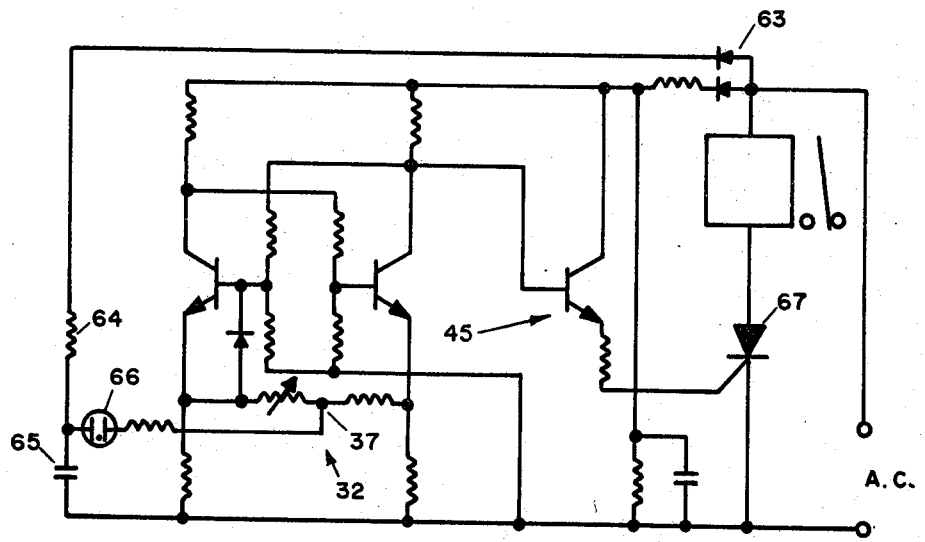

Another embodiment of the invention is shown in FIG. 4 which operates on direct A.C. line voltage and embodies a neon bulb and R-C circuit for the trigger sampling network. A rectifier 63 feeds an R-C circuit including a resistor 64 and capacitor 65 between which is tapped one terminal of a neon bulb 66. The other side of the bulb is connected to bridge input junction 37. Upon the R-C circuit reaching the necessary voltage peak, the neon bulb 66 will conduct and send a very sharp pulse to the bridge circuit 32 with the pulse repetition rate again being determined by the R-C time-constant. The output of the switching transistor 45 is then used to trigger an SCR 67.

In all of these examples, a diode 68 shunts the output of variable resistor 35 to the base 22 of transistor 20. This protects against high base to emitter voltages which may appear when the resistance of variable resistor 35 is very low.

While the invention has been shown with the trigger sampling pulse being applied to the emitter of the transistors, it also can be utilized when applied to the base circuits of the transistors. Moreover, while the bridge circuit has been utilized in these examples, other means of supplying a voltage difference between the transistors such as independent transducers may be employed as to trigger the circuit. Also, while a relay coil has been shown in the switching circuit 12, other energy sensitive elements or devices may be controlled.

It is to be understood that the embodiments of the invention described above are for the purpose of illustration only and that the scope of the invention is to be limited solely by the following claims:

What I claim is:
1. A circuit comprising,
   (a) a flip-flop circuit capable of assuming two stable states of equilibrium,
   (b) a bridge having an input and an output,
   (c) said bridge having means in at least one leg thereof capable of changing the balance state of said bridge,
   (d) means for supplying energy sampling pulses to the input of said bridge at spaced intervals to determine the balance state of said bridge,
   (e) control means coupled to the output of said flip-flop circuit, said control means having a signal circuit and an output circuit,
   (f) an energy sensitive element connected to the output circuit of said control means,
   (g) the output of said bridge being coupled to the input of said flip-flop to apply triggering pulses to said flip-flop such that a change in balance state of said bridge will cause said flip-flop to change from one of said states of equilibrium to the other and remain in said changed state of equilibrium until the balance state of said bridge is again changed, and
   (h) the output of said flip-flop being coupled to the control circuit of said control means to cause said control means to be energized when said flip-flop is in one state of equilibrium and to be de-energized when said flip-flop is in its other state of equilibrium.
2. A control circuit as claimed in claim 1 wherein said bridge is of the resistive type.
3. A control circuit comprising,
   (a) a flip-flop circuit capable of assuming two states of equilibrium,
   (b) bridge means for triggering said flip-flop circuit to one state of equilibrium or the other,
   (c) means for supplying a sampling pulse to said triggering means at periodic intervals,
   (d) switching means having a control circuit and a power circuit with the control circuit being connected to the output of said flip-flop circuit and being actuated when said flip-flop circuit is in one of said states of equilibrium,
   (e) a power source connected to the power circuit of said switching device,
   (f) said power source being phased to provide power to said switching device in pulses out of phase with the sampling pulses to said triggering means.
4. Control circuit as claimed in claim 3 wherein means are provided for supplying said sampling pulses to said trigger means are approximately 180° out of phase with the power pulses to said switching means.
5. A circuit comprising,
   (a) a flip-flop circuit including a pair of transistors,
   (b) a bridge coupled to the input of said transistors,
   (c) said bridge having a variable element in one leg thereof to effect an unbalance in the voltage applied to the input of said transistors and thereby switch said flip-flop circuit from one state of equilibrium to another by driving one or the other of said transistors to cut off,
   (d) means for supplying an energy sampling pulse to said bridge at a pre-determined frequency,
   (e) a switching device,
   (f) said switching device having a control circuit and a power circuit,
   (g) said control circuit of said switching device being coupled across the output of one of said transistors,
   (h) an energy sensitive element connected in the power circuit of said switching device, and
   (i) a power source for said switching device operable to provide spaced pulses of energy at a periodic frequency approximately 180° out of phase with the pulses being applied to said bridge.
6. A control circuit as claimed in claim 5, wherein the power source includes an A.C. supply and a half wave rectifier appears in the input to the bridge to provide the sampling pulses.

7. A circuit as claimed in claim 1, wherein a neon bulb is coupled to the input of the bridge circuit with the frequency of the neon bulb conducting pulse being determined by an R-C circuit coupled to the input to said neon bulb.

8. A circuit as claimed in claim 1 wherein the output of a uni-junction transistor is coupled to the input to the bridge, and wherein an R-C circuit is coupled to the emitter of said uni-junction to provide the energy sampling pulse.

References Cited

UNITED STATES PATENTS

| | | | |
|---|---|---|---|
| 3,005,935 | 10/1961 | Wood | 317—148.5 |
| 3,054,003 | 9/1962 | Pagano et al. | 307—247 |
| 3,128,412 | 4/1964 | Abromaitis | 328—206 X |
| 3,248,634 | 4/1966 | Fudaley et al. | 307—291 X |
| 3,300,689 | 1/1967 | Beddoes | 307—247 X |
| 3,013,159 | 12/1961 | DeSautels | 307—290 |
| 3,281,073 | 10/1966 | Chou et al. | 307—310 |
| 2,813,934 | 11/1957 | Ciberlius et al. | 307—291 |

FOREIGN PATENTS 1,115,295  10/1961  Germany.

JOHN S. HEYMAN, Primary Examiner

J. D. FREW, Assistant Examiner

U.S. Cl. X.R.

307—247, 292; 328—2, 194, 195, 196, 206